US012740907B2

(12) United States Patent
Wray et al.

(10) Patent No.: US 12,740,907 B2
(45) Date of Patent: Sep. 22, 2026

(54) RENTAL CASKET INSERT

(71) Applicant: Batesville Services, LLC, Batesville, IN (US)

(72) Inventors: Greg Wray, Guilford, IN (US); Rick Webber, Batesville, IN (US)

(73) Assignee: BATESVILLE SERVICES, LLC, Batesville, IN (US)

(*) Notice: Subject to any disclaimer, the term of this patent is extended or adjusted under 35 U.S.C. 154(b) by 0 days.

(21) Appl. No.: 19/011,005

(22) Filed: Jan. 6, 2025

(65) Prior Publication Data

US 2025/0221873 A1 Jul. 10, 2025

Related U.S. Application Data

(60) Provisional application No. 63/618,591, filed on Jan. 8, 2024.

(51) Int. Cl.

| | |
|---|---|
| ***A61G 17/04*** | (2006.01) |
| ***A61G 17/00*** | (2006.01) |
| ***A61G 17/007*** | (2006.01) |
| ***A61G 17/02*** | (2006.01) |

(52) U.S. Cl.

CPC .......... *A61G 17/042* (2016.11); *A61G 17/001* (2017.05); *A61G 17/004* (2016.11); *A61G 17/0073* (2013.01); *A61G 17/034* (2017.05)

(58) Field of Classification Search

CPC .. A61G 17/042; A61G 17/001; A61G 17/004; A61G 17/0073; A61G 17/034; A61G 17/0405; B65D 5/54; B65D 5/301; B65D 5/308

See application file for complete search history.

(56) References Cited

U.S. PATENT DOCUMENTS

| | | | | |
|---|---|---|---|---|
| 8,356,392 | B2 * | 1/2013 | Jackson | A61G 17/004 27/4 |
| 9,078,798 | B2 * | 7/2015 | Centenari | A61G 17/0073 |
| 9,427,369 | B2 * | 8/2016 | Cox | A61G 17/0407 |
| 10,098,801 | B2 * | 10/2018 | Cox | A61G 17/004 |
| 10,500,117 | B2 * | 12/2019 | Davis | A61G 17/034 |
| 11,318,061 | B2 * | 5/2022 | Houde | A61G 17/042 |

(Continued)

FOREIGN PATENT DOCUMENTS

| | | | |
|---|---|---|---|
| GB | 2619504 A * | 12/2023 | A61G 17/0073 |

*Primary Examiner* — William L Miller

(74) *Attorney, Agent, or Firm* — Dinsmore & Shohl LLP

(57) ABSTRACT

Embodiments for streamlined training are provided. One embodiment of a rental casket insert includes a base for receiving a deceased onto an interior surface that includes a lower panel, a first base end panel, a second base end panel, a first base side panel, and a second base side panel, where the base is configured is defined by a base length, a base width, and a base height. The rental casket insert may also include a lid for engaging with the interior surface of the base that includes an upper panel, a first lid end panel, a second lid end pane, a first lid side panel and a second lid side panel, where the lid is defined by a lid length, a lid width, and a lid height, where the lid height is greater than the base height, and where the lid includes at least one detachable portion, wherein the at least one detachable portion is configured as a perforated section for removal to allow coupling of the lid with the base when a deceased is disposed in the base against the interior surface.

20 Claims, 6 Drawing Sheets

(56) References Cited

U.S. PATENT DOCUMENTS

| | | | | |
|---|---|---|---|---|
| 11,504,291 | B2 * | 11/2022 | Davis | A61G 17/0073 |
| 12,109,154 | B2 * | 10/2024 | Davis | A61G 17/034 |
| 12,171,697 | B1 * | 12/2024 | Garvin | A61G 17/004 |
| 12,533,278 | B2 * | 1/2026 | Davis | A61G 17/004 |
| 2003/0167611 | A1 * | 9/2003 | Belanger | A61G 17/0073 27/4 |
| 2005/0050700 | A1 * | 3/2005 | Davis | A61G 17/001 27/18 |
| 2007/0084028 | A1 * | 4/2007 | Cox | A61G 17/004 27/4 |
| 2010/0282831 | A1 * | 11/2010 | Fithian | B65D 5/321 229/238 |
| 2011/0000059 | A1 * | 1/2011 | Davis | A61G 17/06 27/14 |
| 2012/0073098 | A1 * | 3/2012 | Centenari | A61G 17/041 27/19 |
| 2014/0026378 | A1 * | 1/2014 | Gessel | A61G 17/0073 27/14 |
| 2014/0230203 | A1 * | 8/2014 | Cox | A61G 17/047 27/4 |
| 2016/0199244 | A1 * | 7/2016 | Cox | A61G 17/004 27/14 |
| 2017/0209326 | A1 * | 7/2017 | Davis | A61G 17/044 |
| 2017/0281448 | A1 * | 10/2017 | Davis | A61G 17/047 |
| 2021/0059885 | A1 * | 3/2021 | Davis | A61G 17/0073 |
| 2021/0106485 | A1 * | 4/2021 | Houde | A61G 17/0073 |
| 2023/0404832 | A1 * | 12/2023 | Davis | A61G 17/0106 |
| 2024/0108527 | A1 * | 4/2024 | Davis | A61G 17/004 |
| 2024/0164972 | A1 * | 5/2024 | Davis | A61G 17/0073 |
| 2024/0374452 | A1 * | 11/2024 | Wilber | A61G 17/034 |
| 2025/0064661 | A1 * | 2/2025 | Davis | B31B 50/262 |

* cited by examiner

RENTAL CASKET INSERT

This application claims the benefit of U.S. Provisional Application Ser. No. 63/618,591, filed Jan. 8, 2024, entitled Rental Casket Insert, which is hereby incorporated by reference in its entirety.

TECHNICAL FIELD

Embodiments provided herein generally relate to a rental casket insert and, more specifically, to a rental casket with a locking feature, as well as configurable lid for accommodating different sized and/or positioned deceased individuals.

BACKGROUND

As the cost of presentation caskets has increased and cremation is becoming more popular, many families are choosing to purchase rental casket inserts for use with a rental casket for their deceased loved ones. A rental casket inert may take different forms, but typically is constructed of corrugated cardboard or other clean combustible material. A rental casket insert is typically shipped unassembled or partially assembled, and the funeral home assembles the rental casket insert. Once assembled, a deceased may be placed in the rental casket insert and the rental casket insert and deceased may be placed into the rental casket for presentation. Once presentation is complete, the rental casket insert and deceased may be removed from the rental casket for cremation.

As will be understood, because the rental casket insert is constructed of a corrugated cardboard or other disposable material and because the rental casket insert is moved with the deceased inside, structural integrity is a focus for funeral homes who perform these tasks. Additionally, security of the lid of the rental casket insert is also a priority. Thus, a need exists in the industry.

SUMMARY

Embodiments for streamlined training are provided. One embodiment of a rental casket insert includes a base for receiving a deceased onto an interior surface that includes a lower panel, a first base end panel, a second base end panel, a first base side panel, and a second base side panel, where the base is configured is defined by a base length, a base width, and a base height. The rental casket insert may also include a lid for engaging with the interior surface of the base that includes an upper panel, a first lid end panel, a second lid end pane, a first lid side panel and a second lid side panel, where the lid is defined by a lid length, a lid width, and a lid height, where the lid height is greater than the base height, and where the lid includes at least one detachable portion, wherein the at least one detachable portion is configured as a perforated section for removal to allow coupling of the lid with the base when a deceased is disposed in the base against the interior surface.

Another embodiment includes a base for receiving a deceased onto an interior surface that includes a lower panel, a first base end panel, a second base end panel, a first base side panel, and a second base side panel, where the base is defined by a base length, a base width, and a base height. Some embodiments include a lid for engaging with the interior surface of the base that includes an upper panel, a first lid end panel, a second lid end pane, a first lid side panel and a second lid side panel, where the lid is defined by a lid length, a lid width, and a lid height, where the lid includes at least one detachable portion, where the at least one detachable portion is configured as a perforated section for removal to allow coupling of the lid with the base when a deceased is disposed in the base against the interior surface, wherein the base further includes a first aperture disposed on the interior surface of the base, and where the lid includes a flap that is coupled to a lower portion of the lid and extends upward, such that when the lid is inserted in the base, the flap operates as a locking mechanism to removably secure the lid to the base.

Yet another embodiment includes a base for receiving a deceased onto an interior surface that includes a lower panel, a first base end panel, a second base end panel, a first base side panel, and a second base side panel, where the base is defined by a base length, a base width, and a base height. Some embodiments include a lid for engaging with the interior surface of the base that includes an upper panel, a first lid end panel, a second lid end pane, a first lid side panel and a second lid side panel, where the lid is denied by a lid length, a lid width, and a lid height, where the lid includes at least one detachable portion, where the at least one detachable portion is configured as a perforated section for removal to allow coupling of the lid with the base when a deceased is disposed in the base against the interior surface, where the base further includes a first aperture disposed on the interior surface of the base, and where lid further includes a first plurality of lid extension panels coupled to the first lid side panel, but not permanently attached to the first lid end panels and a second plurality of lid extension panels coupled to the second lid side panel but not permanently attached to the second lid end panel, and where the first lid end panel includes a first center end panels and the second lid end panel includes a second center end panel.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein include a rental casket insert. Some embodiments include a locking mechanism for removably securing a lid to a base. Some embodiments may be configured for providing space for inserting a lid on a base with a deceased present. Embodiments of the rental casket insert incorporating the same will be described in more detail, below.

Figure 1:
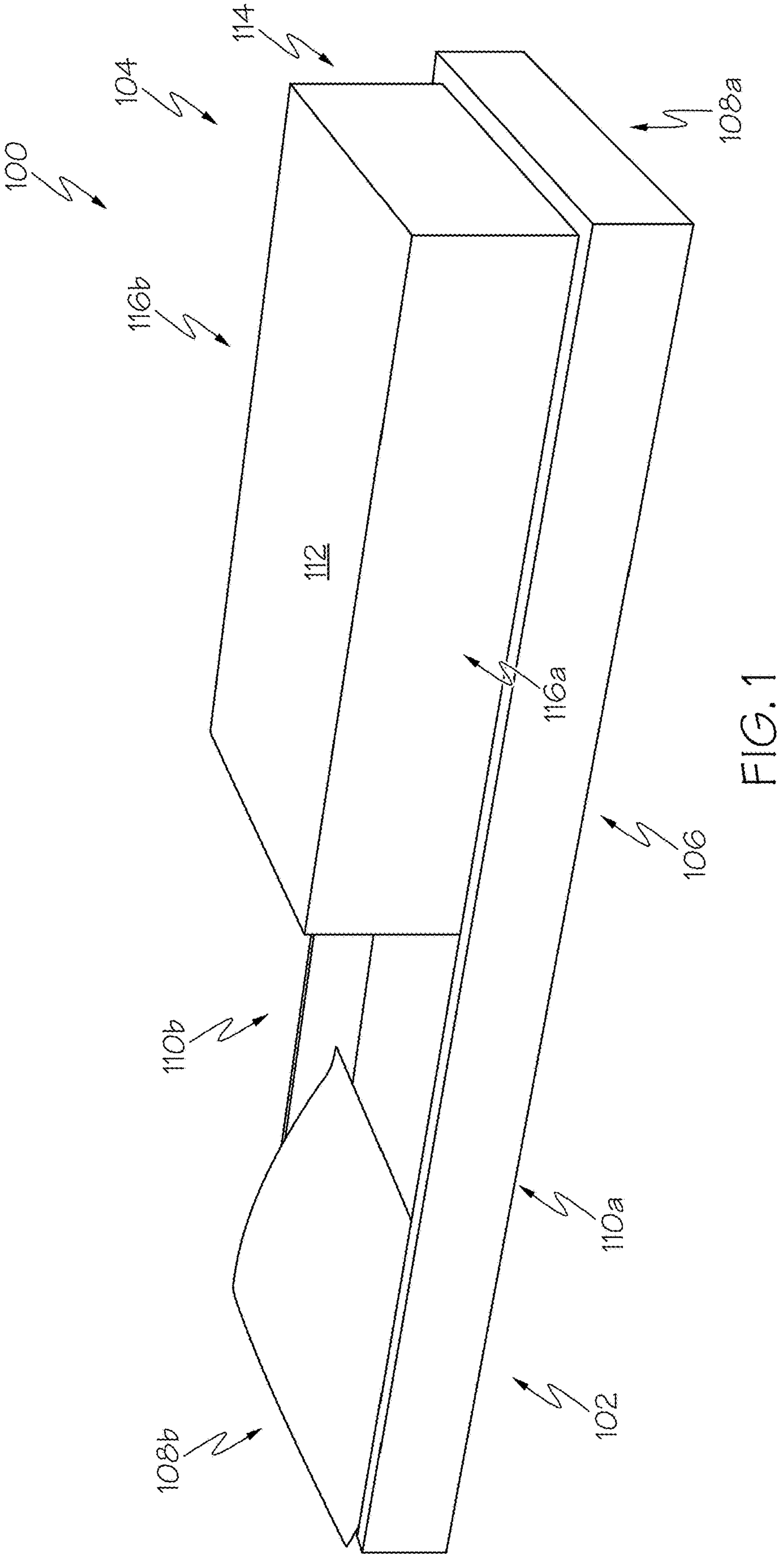
FIG. 1 depicts a perspective view of a rental casket insert according to embodiments provided herein.

Referring now to the drawings, FIG. 1 depicts a perspective view of a rental casket insert 100 according to embodiments provided herein. As illustrated, the rental casket insert 100 may include a base 102 and a lid 104. The base 102 may include a lower panel 106, base end panels 108*a*, 108*b*, and base side panels 110*a*, 110*b*. The lid 104 may include an upper panel 112, lid end panels 114*a*, 114*b* (114*b* not depicted in FIG. 1), and lid side panels 116*a*, 116*b*. As illustrated in the example of FIG. 1, the lid 104 may fit within the cavity defined by the base end panels 108*a*, 108*b* and the base side panels 110*a*, 110*b*. In such an embodiment, the upper panel 112 may contact an inner surface of the base side panels 110 and/or the base end panels 108 to keep the upper panel 112 in place. As will be understood, while FIG. 1 illustrates the lid 104 as being truncated, this is merely one example to show the interior of the base 102. Some embodiments include a full length lid 104.

Figure 2:
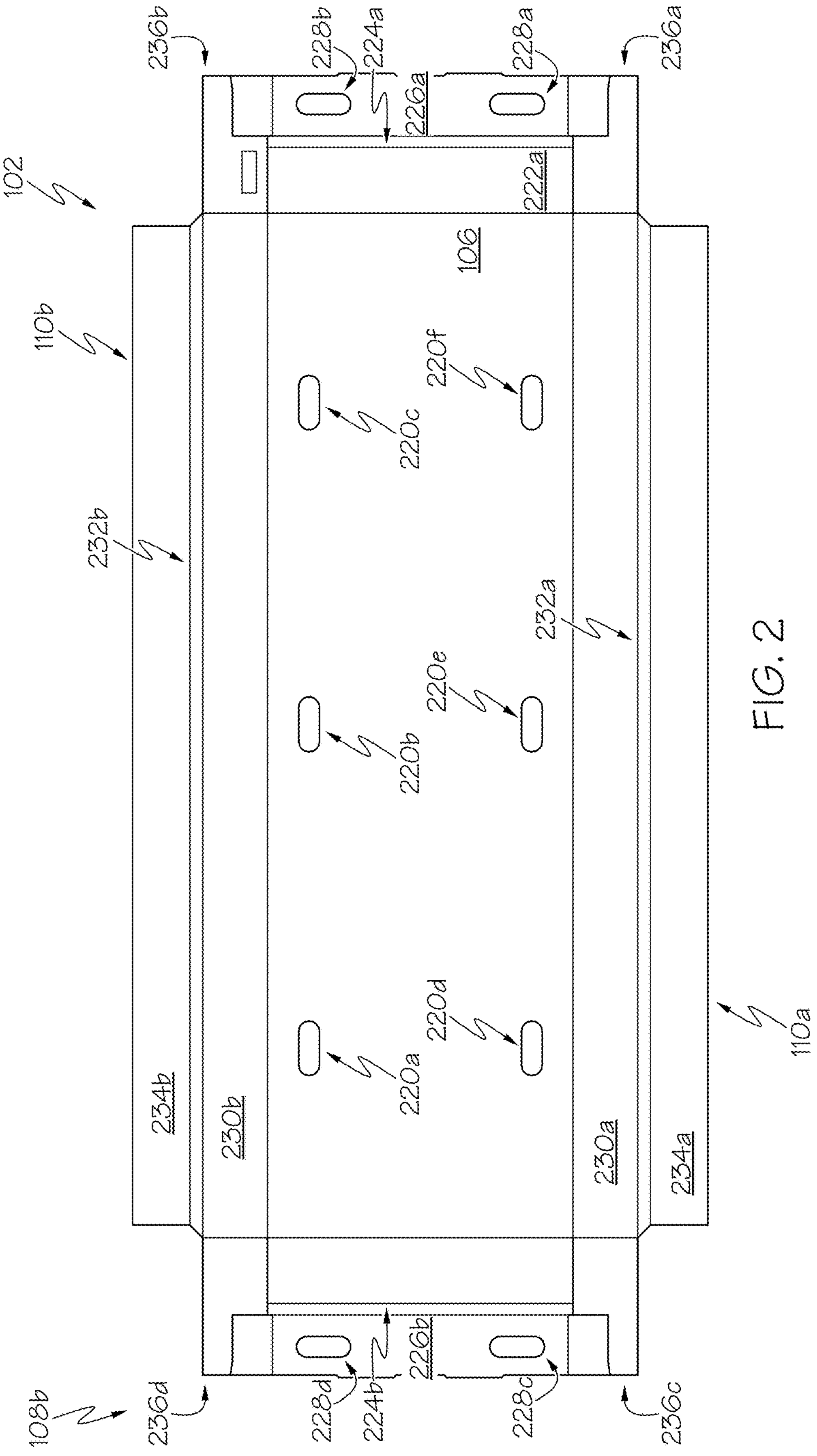
FIG. 2 depicts an unassembled representation of a base of the rental casket insert, according to embodiments provided herein.

FIG. 2 depicts an unassembled representation of a base 102 of the rental casket insert 100, according to embodiments provided herein. As illustrated, the lower panel 106 may include one or more handling apertures 220*a*, 220*b*, 220*c*, 220*d*, 220*c*, 220*f*. The handling apertures 220 may be utilized to aid a human in handling. As will be understood, those embodiments with handling apertures 220 may also include an inner layer that is configured as a structural support layer and/or a fluid impermeable layer to support and contain a deceased, as well as an outer layer that includes the handling aperture 220. In some embodiments, these layers are separate and removable, while in others they are the same layer and/or permanently secured together.

Stated another way, embodiments of the base 102 may include a plurality of layers of material, such as an exterior layer and a fluid impermeable layer disposed on an inner surface of the exterior layer. As such, the handling aperture 220 may be disposed only on the exterior layer, while the fluid impermeable layer may not include any apertures. Such as configuration may maintain the fluid containment properties of the interior fluid impermeable layer, while providing handling advantages provided by the change is surface from the at least one handling aperture 220. As will be understood, some embodiments may structure the handling aperture 220 as circular, semicircular, rectangular cutouts on the exterior layer. However, some embodiments may be configured such that the cutouts are attached to the base 102 to function as handles themselves.

Similarly, the base end panels 108*a*, 108*b* may include an inner base end panel 222*a*, 222*b*, a middle base end panel 224*a*, 224*b*, and an outer base end panel 226*a*, 226*b*. In some embodiments, the inner base end panels 222*a*, 222*b* may include apertures 228*a*, 228*b*, 228*c*, 228*d* for assisting a mover in transporting the rental casket insert 100 with deceased inside.

Similarly, the base side panels 110*a*, 110*b* include an outer base side panel 230*a*, 230*b*, a middle base panel 232*a*, 232*b*, and an inner base side panel 234*a*, 234*b*. Also included is a side panel member 236*a*, 236*b*, 236*c*, 236*d*.

While the depiction in FIG. 2 is that of an unassembled configuration of the base 102, an assembled configuration of the base 102 would include the inner base side panels 234*a*, 234*b* being folded toward the center of the base 102. Similarly, the inner base end panels 222*a*, 222*b* are folded toward the center of base 102. The side panel members 236 are disposed between the inner base end panel 222 and the outer base end panel 226.

Figure 3:
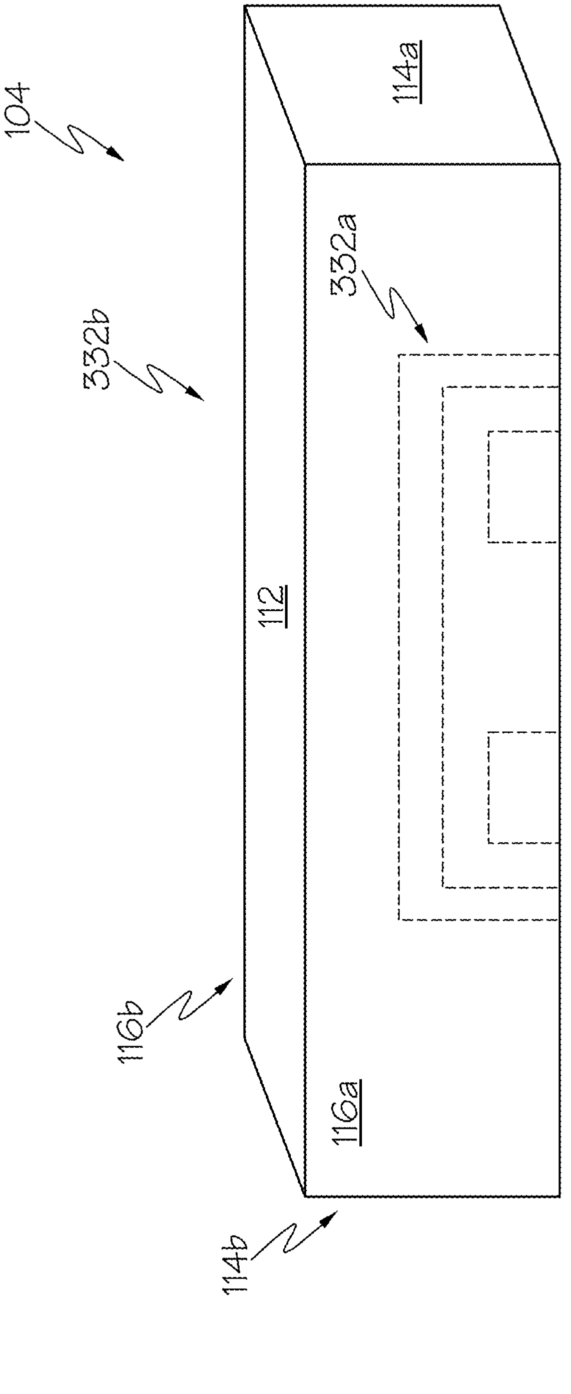
FIG. 3 depicts a perspective view of a lid for a rental casket insert, according to embodiments provided herein.

FIG. 3 depicts a perspective view of a lid 104 for a rental casket insert 100, according to embodiments provided herein. As illustrated, the lid 104 may include an upper panel 112, lid end panels 114, and lid side panels 116. Additionally, some embodiments may include one or more detachable portions 332*a*, 332*b*. The detachable portions 332*a*, 332*b* may be configured to accommodate a deceased when the lid 104 is removably attached to the base 102. As discussed above, the lid 104 may be positioned within the cavity defined by the lower panel 106, base end panels 108, and the base side panels 110. As such, when a deceased is positioned inside the cavity of the base 102, oftentimes a portion of the deceased may rest against a base end panel 108 and/or base side panel 110, thereby reducing the ability for the lid 104 to be properly inserted into cavity. As such, the detachable portions 332, which may be configured as a plurality of concentric perforated sections, may be utilized to be removed from the lid 104 at an area where the deceased is resting against the base side panel 110 and/or base end panel 108, thereby allowing the lid 104 to be properly inserted into the cavity, without disturbing the deceased.

It should be understood that while the detachable portions 332 depicted in FIG. 3 have a concentric rectangular pattern, other patterns and positions may be utilized. Similarly, while the detachable portions 332 are depicted on the lid side panels 116, some embodiments may include one or more on a lid end panel 114 and/or upper panel 112.

Figure 4:
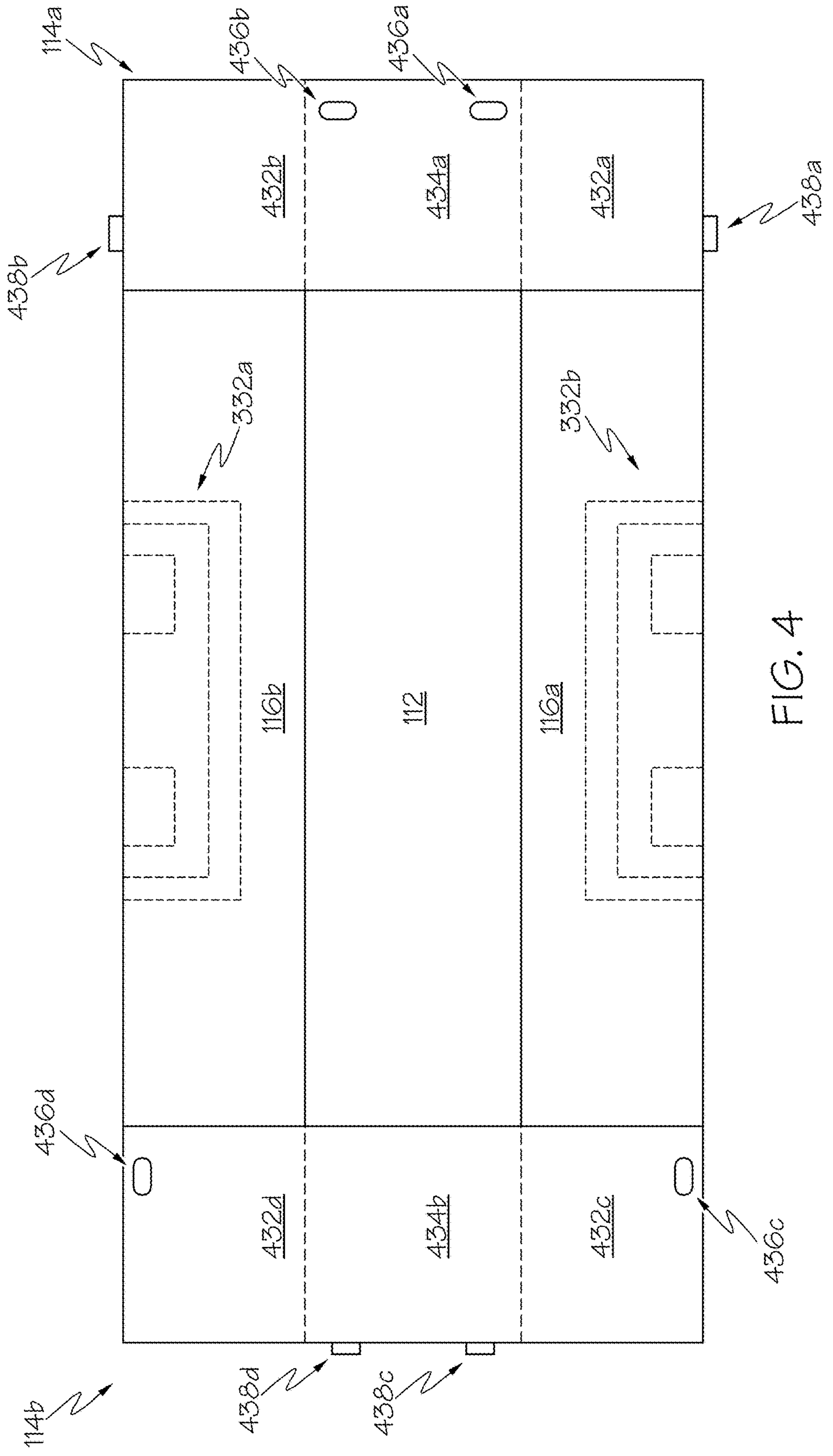
FIG. 4 depicts an unassembled representation of the lid of a rental casket insert, according to embodiments provided herein.

FIG. 4 depicts an exploded view of the lid 104 of a rental casket insert 100, according to embodiments provided herein. As illustrated, the lid 104 of FIG. 4 is presented in a deconstructed configuration. As such, the lid 104 may include the upper panel 112, the lid end panels 114*a*, 114*b*, and the lid side panels 116*a*, 116*b*. Additionally, the lid 104 includes lid extension panels 432*a*, 432*b*, 432*c*, 432*d*. The lid extension panels 432 may be coupled to the lid side panels 116*a*, 116*b*, but may not be permanently attached to the lid end panels 114*a*, 114*b*. Additionally, the lid end panels 114*a*, 114*b*, may include center end panels 434 (e.g., first center end panel 434*a* and second center end panel 434*b*). In some embodiments, the center end panels 434*a*, 434*b*, include one or more notches 436*a*, 436*b* for receiving respective flaps 438*a*, 438*b* that are disposed on the lid extension panels 432*a*, 432*b*. Similarly, some embodiments may be configured such that the notches 436*c*, 436*d* are disposed on the lid extension panels 432*c*, 432*d* and the flaps 438*c*, 438*d* are disposed on the center end panel 434*b*. As will be understood FIG. 4 depicts both embodiments, but in practice, notches 436 and the plurality of flaps 438 may be disposed consistently on each side.

In constructing the lid 104, the lid side panels 116*a*, 116*b* are folded up approximately 90 degrees (out of page), as well as the center end panels 434*a*, 434*b*. The lid extension panels 432*a*, 432*b* may both be disposed inside the center end panel 434*a* and the flaps 438*a*, 438*b* may be inserted into the notches 436*a*, 436*b*, respectively to secure the lid extension panels 432*a* to the center end panel 434*a*. As will be understood, this embodiment may serve as a locking function.

In some embodiments, the center end panel 434*b* may be folded up approximately 90 degrees (out of page) and the lid extension panels 432*c*, 432*d* may be folded outside the center end panel 434*b*. The flaps 438*c*, 438*d* may be inserted into the notches 436*c*, 436*d*, respectively to secure the lid extension panels 432*c*, 432*d* to the center end panel 434*b*.

Again, with the flaps 438*c*, 438*d* extending outward, the flaps 438*c*, 438*d* may serve as part of the locking function described below.

It will be understood that while the example of FIG. 4 depicts each of the lid extension panels 432 as extending across the entirety of the center end panels 434*a*, 434*b*, respectively, this is one embodiments. In some embodiments, the lid extension panels 432 each only extend about halfway across the center end panels 434*a*, 434*b*, respectively. Other embodiments regarding the length of the lid extension panels 432 are also contemplated.

Figure 5:
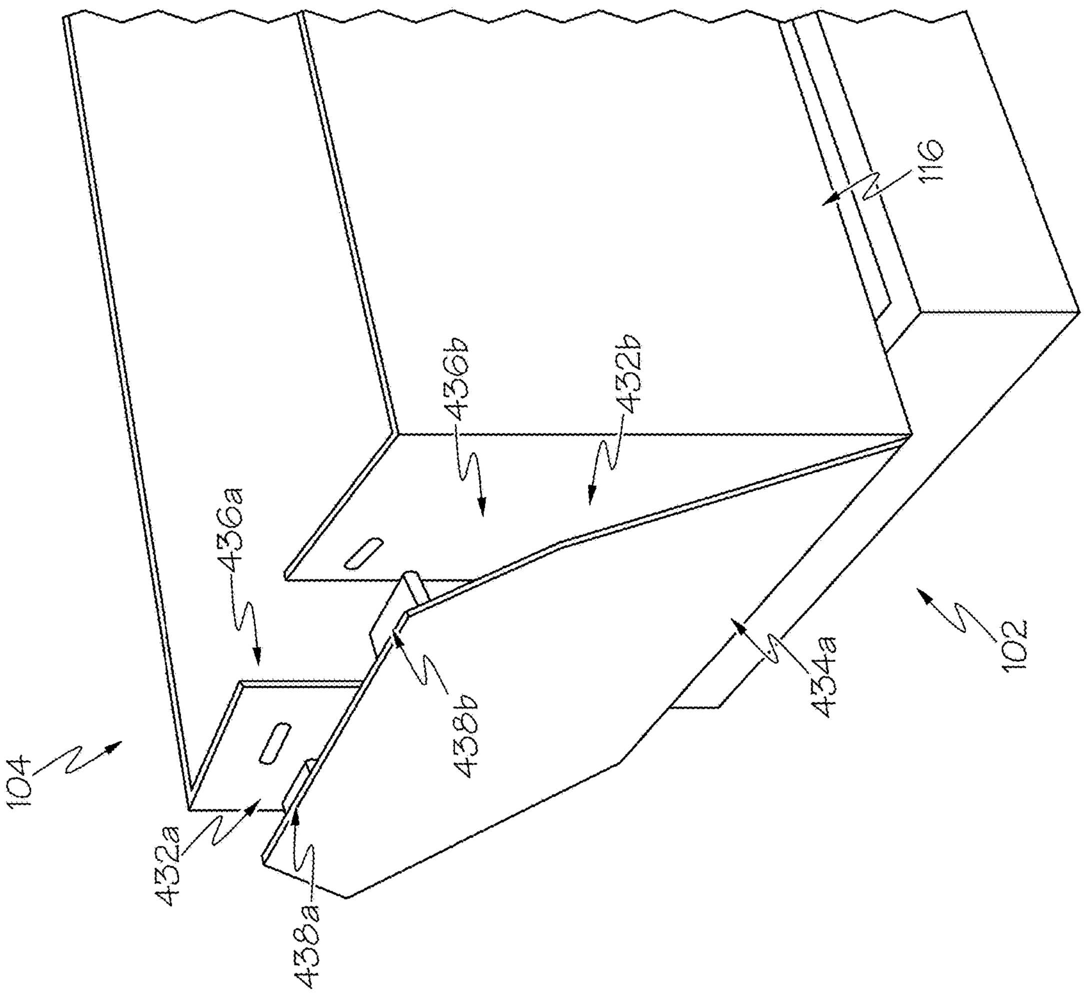
FIG. 5 depicts a perspective view of the lid of a rental casket insert, according to embodiments provided herein.

FIG. 5 depicts a perspective view of the lid 104 of a rental casket insert 100, according to embodiments provided herein. As illustrated, the embodiment of FIG. 5 depicts that the lid extension panels 432*a*, 432*b* are folded inward and disposed inside the center end panel 434*a*. The flaps 438*a*, 438*b* are inserted into the notches 436*a*, 436*b*, respectively to secure the center end panel 434*a* to the lid extension panels 432*a*, 432*b*.

As will be understood this embodiment is configured such that the flaps 438*a*, 438*b* are directed inward when engaged with the notches 436*a*, 436*b*. Some embodiments configured in this manner may utilize an extension piece on the flaps 438*a*, 438*b* that extends outward to provide the locking mechanism discussed with reference to FIGS. 6A, 6B. Other configurations are also contemplated.

Figure 6A:
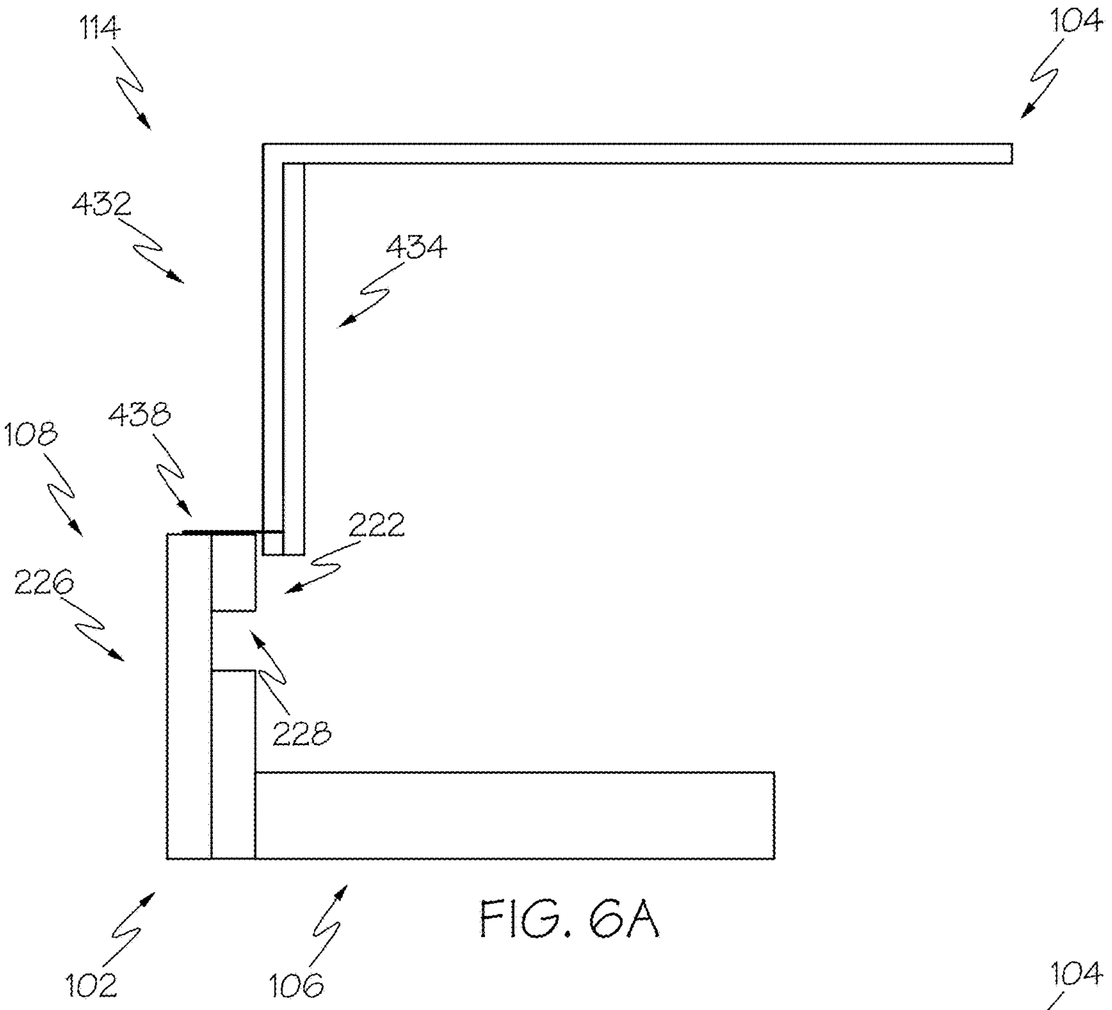
FIG. 6A depicts a lateral view of engagement of the lid with the base of a rental casket insert, depicting a resting mechanism, according to embodiments provided herein.

FIG. 6A depicts a lateral view of engagement of the lid 104 with the base 102 of a rental casket insert 100, depicting a resting mechanism, according to embodiments provided herein. As illustrated, the lid 104 may be placed on the base 102, such that the lid 104 is disposed within the cavity (e.g., disposed inside the base end panels 108 and base side panels 110). As such, the flap 438, which extends outward from the lid end panel 114 and may be utilized to rest the lid 104 on the middle base end panel 224 (not depicted in FIG. 6A, 6B) and/or on the edges of the inner base end panel 222 and/or the outer base end panel 226. This may provide a configuration where the lid 104 may be able to cover a deceased without fully engaging with the base 102.

Figure 6B:
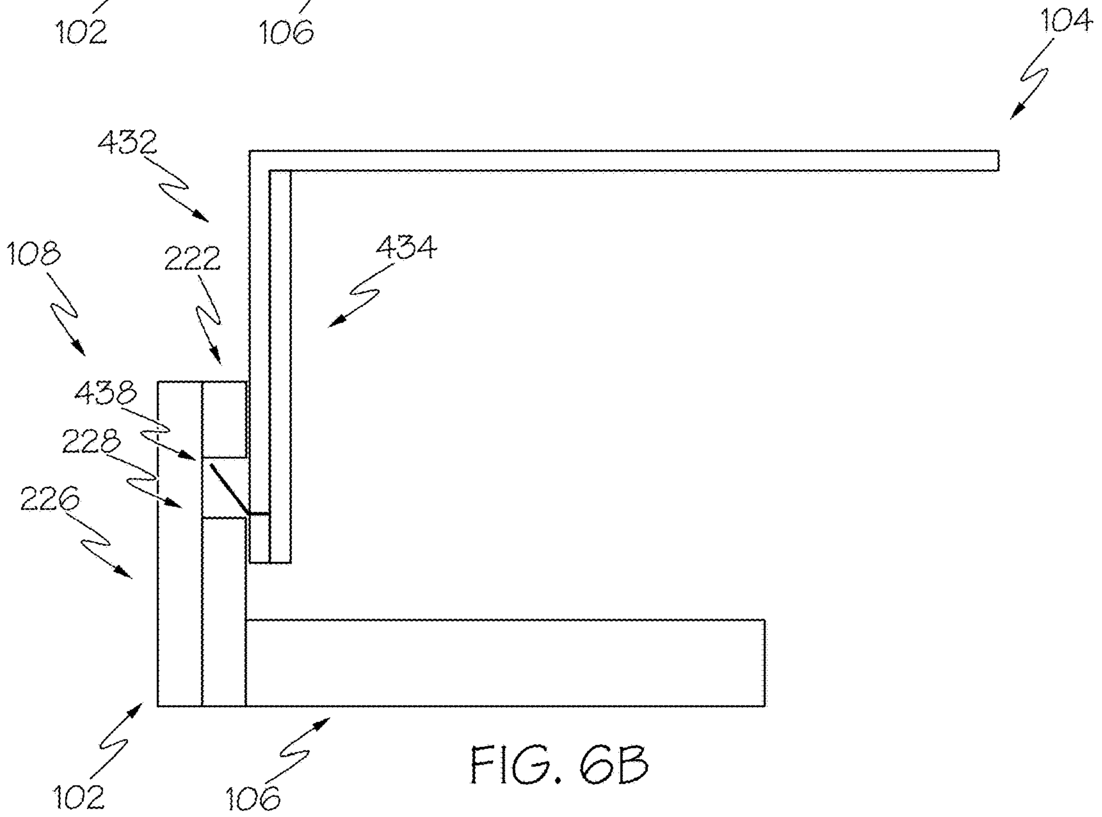
FIG. 6B depicts a lateral view of engagement of the lid with the base of a rental casket insert, depicting a locking mechanism, according to embodiments provided herein.

FIG. 6B depicts a lateral view of engagement of the lid 104 with the base 102 of a rental casket insert 100, depicting a locking mechanism, according to embodiments provided herein. As illustrated, the lid 104 may be forced downward to engage further with the base 102. In this configuration, the flap 438 may bend upward allowing the lid 104 to move downward. While the flap 438 is in this position, the flap 438 is exerting an outward force on the interior surface of the base end panel 108. The lid 104 may be pushed to (or past) the aperture 228. Thus, if an upward force is placed on the lid 104 relative to the base 102, which would normally cause the lid 104 to disengage with the base 102, the flap 438 will engage with the aperture 228 and/or an interior surface of a first layer or second layer of the base 102, as shown in FIG. 6B, restricting further upward movement, thereby removably locking the lid 104 to the base 102.

In some embodiments, this locking mechanism may be overcome by additional upward force applied to the lid 104, which may break or deform the flap 438 to such an extent that it may no longer operate as a locking mechanism. In some embodiments, the flap 438 will be reusable. In some embodiments, the lid 104 may only be disengaged from this locking mechanism by pushing the lid 104 below the aperture 228 and inserting a tool between the base end panel 108 and the flap 438 to restrict outward movement of the flap 438, as the lid 104 is forced upward past the aperture 228.

As illustrated above, various embodiments of a rental casket insert are disclosed. These embodiments may provide lid security by providing a locking mechanism, a resting mechanism, and detachable sections to accommodate a deceased, while still being able to maintain the removable coupling of the base with the lid.

Accordingly, embodiments provided herein may include one or more of the following aspects:

A first aspect may include rental casket insert comprising: a base for receiving a deceased onto an interior surface that includes a lower panel, a first base end panel, a second base end panel, a first base side panel, and a second base side panel, wherein the base is configured is defined by a base length, a base width, and a base height; and a lid for engaging with the interior surface of the base that includes an upper panel, a first lid end panel, a second lid end pane, a first lid side panel and a second lid side panel, wherein the lid is defined by a lid length, a lid width, and a lid height, wherein the lid height is greater than the base height, and wherein the lid includes at least one detachable portion, wherein the at least one detachable portion is configured as a perforated section for removal to allow coupling of the lid with the base when the deceased is disposed in the base against the interior surface.

A second aspect may include the first aspect, wherein the at least one detachable portion is configured as a plurality of concentric perforated sections.

A third aspect may include the first aspect and/or the second aspect, wherein the at least one detachable portion is disposed along at least one of the following: the first lid end panel, the second lid end pane, the first lid side panel or the second lid side panel.

A fourth aspect may include any of the first aspect through the third aspect, wherein the base further includes a first aperture disposed on the interior surface of the base, and wherein the lid includes a flap that is coupled to a lower portion of the lid and extends upward, such that when the lid is inserted in the base, the flap operates as a locking mechanism to removably secure the lid to the base.

A fifth aspect may include any of the first aspect through the fourth aspect, wherein the base includes an inner layer that defines the interior surface and an outer layer, wherein the base further includes a handling aperture disposed on the outer layer of the base for aiding in a human moving the rental casket insert.

A sixth aspect may include any of the first aspect through the fifth aspect, wherein the handling aperture is disposed along at least one of the following: the lower panel, the first base end panel, the second base end panel, the first base side panel, or the second base side panel.

A seventh aspect may include any of the first aspect through the sixth aspect, wherein the inner layer is configured as at least one of the following: a structural support layer or a fluid impermeable layer.

A eighth aspect may include any of the first aspect through the seventh aspect, wherein the lid further includes a first plurality of lid extension panels coupled to the first lid side panel, but not permanently attached to the first lid end panel and a second plurality of lid extension panels coupled to the second lid side panel but not permanently attached to a second lid end panel, and wherein the first lid end panel includes a first center end panel and the second lid end panel includes a second center end panel.

A ninth aspect may include any of the first aspect through the eighth aspect, wherein the first center end panel and the second center end panel each includes a plurality of flaps and the first plurality of lid extension panels and the second plurality of lid extension panels each include respective notches for receiving the respective flaps when the lid is assembled.

A tenth aspect may include any of the first aspect through the ninth aspect, wherein the first plurality of lid extension panels and the second plurality of lid extension panels each include a plurality of flaps and the first center end panel and the second center end panel each includes respective notches for receiving the respective flaps when the lid is assembled.

An eleventh aspect may include a rental casket insert comprising: a base for receiving a deceased onto an interior surface that includes a lower panel, a first base end panel, a second base end panel, a first base side panel, and a second base side panel, wherein the base is defined by a base length, a base width, and a base height; and a lid for engaging with the interior surface of the base that includes an upper panel, a first lid end panel, a second lid end pane, a first lid side panel and a second lid side panel, wherein the lid is defined by a lid length, a lid width, and a lid height, wherein the lid includes at least one detachable portion, wherein the at least one detachable portion is configured as a perforated section for removal to allow coupling of the lid with the base when the deceased is disposed in the base against the interior surface, wherein the base further includes a first aperture disposed on the interior surface of the base, and wherein the lid includes a flap that is coupled to a lower portion of the lid and extends upward, such that when the lid is inserted in the base, the flap operates as a locking mechanism to removably secure the lid to the base.

A twelfth aspect includes the eleventh aspect, wherein the lid height is greater than the base height.

A thirteenth aspect includes the eleventh and/or twelfth aspect, wherein the at least one detachable portion is configured as a plurality of concentric perforated sections.

A fourteenth aspect may include any of the eleventh aspect through the thirteenth aspect, wherein the at least one detachable portion is disposed along at least one of the following: the first lid end panel, the second lid end pane, the first lid side panel or the second lid side panel.

A fifteenth aspect may include any of the eleventh aspect through the fourteenth aspect, wherein the lid further includes a first plurality of lid extension panels coupled to the first lid side panel, but not permanently attached to the first lid end panel and a second plurality of lid extension panels coupled to the second lid side panel but not permanently attached to a second lid end panel, and wherein the first lid end panel includes a first center end panel and the second lid end panel includes a second center end panel.

A sixteenth aspect may include any of the eleventh aspect through the fifteenth aspect, wherein the first center end panel and the second center end panel each includes a plurality of flaps and the first plurality of lid extension panels and the second plurality of lid extension panels each include respective notches for receiving the respective flaps when the lid is assembled.

A seventeenth aspect may include any of the eleventh aspect through the sixteenth aspect, wherein the first plurality of lid extension panels and the second plurality of lid extension panels each include a plurality of flaps and the first center end panel and the second center end panel each includes respective notches for receiving the respective flaps when the lid is assembled.

An eighteenth aspect includes rental casket insert comprising: a base for receiving a deceased onto an interior surface that includes a lower panel, a first base end panel, a second base end panel, a first base side panel, and a second base side panel, wherein the base is defined by a base length, a base width, and a base height; and a lid for engaging with the interior surface of the base that includes an upper panel, a first lid end panel, a second lid end pane, a first lid side panel and a second lid side panel, wherein the lid is denied by a lid length, a lid width, and a lid height, wherein the lid includes at least one detachable portion, wherein the at least one detachable portion is configured as a perforated section for removal to allow coupling of the lid with the base when the deceased is disposed in the base against the interior surface, wherein the base further includes a first aperture disposed on the interior surface of the base, wherein the lid further includes a first plurality of lid extension panels coupled to the first lid side panel, but not permanently attached to the first lid end panel and a second plurality of lid extension panels coupled to the second lid side panel but not permanently attached to a second lid end panel, and wherein the first lid end panel includes a first center end panel and the second lid end panel includes a second center end panel.

A nineteenth aspect includes the eighteenth aspect, wherein the at least one detachable portion is configured as a plurality of concentric perforated sections, and wherein the at least one detachable portion is disposed along at least one of the following: the first lid end panel, the second lid end pane, the first lid side panel or the second lid side panel.

A twentieth aspect includes the eighteenth aspect and/or the nineteenth aspect, wherein the first center end panel and the second center end panel each includes a plurality of flaps and the first plurality of lid extension panels and the second plurality of lid extension panels each include respective notches for receiving the respective flaps when the lid is assembled.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

What is claimed is:

1. A rental casket insert comprising:

a base for receiving a deceased onto an interior surface that includes a lower panel, a first base end panel, a second base end panel, a first base side panel, and a second base side panel, wherein the base is configured is defined by a base length, a base width, and a base height; and a lid for engaging with the interior surface of the base that includes an upper panel, a first lid end panel, a second lid end panel, a first lid side panel and a second lid side panel, wherein the lid is defined by a lid length, a lid width, and a lid height, wherein the lid height is greater than the base height, wherein the lid includes at least one detachable portion, wherein a portion of the deceased contacts the interior surface of the base, restricting engagement of the lid with the base, wherein the at least one detachable portion is configured as a perforated section for removal, wherein removing the at least one detachable portion of the lid carves out an area of the lid around the portion of the deceased, removing the restriction imposed by the portion of the deceased to allow engagement of the lid with the base.

2. The rental casket insert of claim 1, wherein the at least one detachable portion is configured as a plurality of concentric perforated sections.

3. The rental casket insert of claim 1, wherein the at least one detachable portion is disposed along at least one of the following: the first lid end panel, the second lid end panel, the first lid side panel or the second lid side panel.

4. The rental casket insert of claim 1, wherein the base further includes a first aperture disposed on the interior surface of the base, and wherein the lid includes a flap that is coupled to a lower portion of the lid and extends upward, such that when the lid is inserted in the base, the flap is received by the first aperture and operates as a locking mechanism to removably secure the lid to the base.

5. The rental casket insert of claim 1, wherein the base includes an inner layer that defines the interior surface and an outer layer, wherein the base further includes a handling aperture disposed on the outer layer of the base for aiding in a human moving the rental casket insert.

6. The rental casket insert of claim 5, wherein the handling aperture is disposed along at least one of the following: the lower panel, the first base end panel, the second base end panel, the first base side panel, or the second base side panel.

7. The rental casket insert of claim 5, wherein the inner layer is configured as at least one of the following: a structural support layer or a fluid impermeable layer.

8. The rental casket insert of claim 1, wherein the lid further includes a first plurality of lid extension panels coupled to the first lid side panel, but not permanently attached to the first lid end panel and a second plurality of lid extension panels coupled to the second lid side panel but not permanently attached to the second lid end panel, and wherein the first lid end panel includes a first center end panel and the second lid end panel includes a second center end panel.

9. The rental casket insert of claim 8, wherein the first center end panel and the second center end panel each includes a plurality of flaps and the first plurality of lid extension panels and the second plurality of lid extension panels each include respective notches for receiving the respective flaps when the lid is assembled.

10. The rental casket insert of claim 8, wherein the first plurality of lid extension panels and the second plurality of lid extension panels each include a plurality of flaps and the first center end panel and the second center end panel each includes respective notches for receiving the respective flaps when the lid is assembled.

11. A rental casket insert comprising:
- a base for receiving a deceased onto an interior surface that includes a lower panel, a first base end panel, a second base end panel, a first base side panel, and a second base side panel, wherein the base is defined by a base length, a base width, and a base height; and
- a lid for engaging with the interior surface of the base that includes an upper panel, a first lid end panel, a second lid end panel, a first lid side panel and a second lid side panel, wherein the lid is defined by a lid length, a lid width, and a lid height, wherein the lid includes at least one detachable portion, wherein a portion of the deceased contacts the interior surface of the base, restricting engagement of the lid with the base, wherein the at least one detachable portion is configured as a perforated section for removal, wherein removing the at least one detachable portion of the lid carves out an area of the lid around the portion of the deceased, removing the restriction imposed by the portion of the deceased to allow engagement of the lid with the base, wherein the base further includes a first aperture disposed on the interior surface of the base, and wherein the lid includes a flap that is coupled to a lower portion of the lid and extends upward, such that when the lid is inserted in the base, the flap is received by the first aperture and operates as a locking mechanism to removably secure the lid to the base.

12. The rental casket insert of claim 11, wherein the lid height is greater than the base height.

13. The rental casket insert of claim 11, wherein the at least one detachable portion is configured as a plurality of concentric perforated sections.

14. The rental casket insert of claim 11, wherein the at least one detachable portion is disposed along at least one of the following: the first lid end panel, the second lid end panel, the first lid side panel or the second lid side panel.

15. The rental casket insert of claim 11, wherein the lid further includes a first plurality of lid extension panels coupled to the first lid side panel, but not permanently attached to the first lid end panel and a second plurality of lid extension panels coupled to the second lid side panel but not permanently attached to the second lid end panel, and wherein the first lid end panel includes a first center end panel and the second lid end panel includes a second center end panel.

16. The rental casket insert of claim 15, wherein the first center end panel and the second center end panel each includes a plurality of end panel flaps and the first plurality of lid extension panels and the second plurality of lid extension panels each include respective notches for receiving the respective end panel flaps when the lid is assembled.

17. The rental casket insert of claim 15, wherein the first plurality of lid extension panels and the second plurality of lid extension panels each include a plurality of flaps and the first center end panel and the second center end panel each includes respective notches for receiving the respective flaps when the lid is assembled.

18. A rental casket insert comprising:
- a base for receiving a deceased onto an interior surface that includes a lower panel, a first base end panel, a second base end panel, a first base side panel, and a second base side panel, wherein the base is defined by a base length, a base width, and a base height; and
- a lid for engaging with the interior surface of the base that includes an upper panel, a first lid end panel, a second lid end panel, a first lid side panel and a second lid side panel, wherein the lid is defined by a lid length, a lid width, and a lid height, wherein the lid includes at least one detachable portion, wherein the at least one detachable portion is configured as a perforated section for removal to allow coupling of the lid with the base when the deceased is disposed in the base against the interior surface, wherein the base further includes a first aperture disposed on the interior surface of the base, wherein the lid further includes a first plurality of lid extension panels coupled to the first lid side panel, but not permanently attached to the first lid end panel and a second plurality of lid extension panels coupled to the second lid side panel but not permanently attached to the second lid end panel, and wherein the first lid end panel includes a first center end panel and the second lid end panel includes a second center end panel.

19. The rental casket insert of claim 18, wherein the at least one detachable portion is configured as a plurality of concentric perforated sections, and wherein the at least one detachable portion is disposed along at least one of the following: the first lid end panel, the second lid end panel, the first lid side panel or the second lid side panel.

20. The rental casket insert of claim 18, wherein the first center end panel and the second center end panel each includes a plurality of flaps and the first plurality of lid extension panels and the second plurality of lid extension panels each include respective notches for receiving the respective flaps when the lid is assembled.

* * * * *